United States Patent [19]

Ning

[11] Patent Number: 5,198,911
[45] Date of Patent: Mar. 30, 1993

[54] HOLOGRAPHIC OPTICAL NOTCH REFLECTORS

[75] Inventor: Xiahhui Ning, N. Providence, R.I.

[73] Assignee: American Optical Corporation, Southbridge, Mass.

[21] Appl. No.: 633,364

[22] Filed: Dec. 27, 1990

[51] Int. Cl.$^5$ .................... G02B 5/32; G02F 1/39; G03H 1/02
[52] U.S. Cl. ........................ 359/3; 359/15; 359/330; 430/1
[58] Field of Search ............. 350/3.7, 3.75, 3.77; 307/425, 428; 359/15, 22, 24, 226, 330, 566, 568, 3; 430/1, 2

[56] References Cited

U.S. PATENT DOCUMENTS

| | | | |
|---|---|---|---|
| 3,444,316 | 5/1969 | Gerritsen | 359/28 |
| 3,479,185 | 11/1969 | Chambers, Jr. | |
| 3,652,275 | 3/1972 | Baum et al. | |
| 3,658,526 | 8/1969 | Haugh | |
| 3,694,218 | 9/1972 | Margerum et al. | |
| 3,917,378 | 11/1975 | Gale | 350/3.77 |
| 3,989,530 | 3/1976 | Robillard | |
| 3,993,485 | 5/1975 | Chandross et al. | |
| 4,049,459 | 2/1976 | Bloom et al. | |
| 4,173,474 | 11/1979 | Tanaka et al. | |
| 4,235,505 | 11/1980 | Hariharan et al. | 350/3.77 |
| 4,258,111 | 5/1979 | Matsumoto et al. | |
| 4,287,277 | 5/1979 | Matsumoto et al. | |
| 4,535,041 | 8/1984 | Fielding et al. | |
| 4,588,664 | 8/1984 | Fielding et al. | |
| 4,601,533 | 7/1986 | Moss | 350/3.77 |
| 4,637,678 | 1/1987 | Moss et al. | 350/3.7 |
| 4,669,811 | 6/1987 | McQuoid | 350/3.7 |
| 4,696,876 | 5/1986 | Cael | |
| 4,786,125 | 11/1988 | Magarinos et al. | 350/3.7 |
| 4,802,719 | 2/1989 | Magarinos et al. | 350/3.7 |
| 4,830,441 | 5/1989 | Chang | 350/3.77 |
| 4,950,567 | 8/1990 | Keys et al. | 350/3.7 |
| 4,958,892 | 9/1990 | Jannson et al. | 359/15 |
| 5,103,323 | 4/1992 | Magarinos et al. | 359/8 |

OTHER PUBLICATIONS

Collier et al., "Multicolor Images from Volume Holograms", *Optical Holography*, New York, Academic Press, 1971, pp. 514 to 522.

*Primary Examiner*—Martin Lerner
*Attorney, Agent, or Firm*—Fishman, Dionne & Cantor

[57] ABSTRACT

A new method for making holographic notch filters in the near infrared spectral region is disclosed. This method utilizes lthe nonlinearity in the response function of holographic materials. When a holographic medium is exposed to two laser beams at different wavelengths, the nonlinearity in the response function causes the formation of notch reflections at wavelengths corresponding to the sum and difference frequencies of the exposing beams. The notch at the difference frequency can be in the NIR region by properly choosing the exposure wavelengths. This method is applicable to holographic filters on both flat and curved substrates.

17 Claims, 1 Drawing Sheet

HOLOGRAPHIC OPTICAL NOTCH REFLECTORS

BACKGROUND OF THE INVENTION

This invention relates generally to narrow band notch reflectors. More particularly, this invention relates to holographic notch reflectors in the near infrared range. Notch reflectors of this invention are extremely well suited for use in laser protective applications.

Holographic media are often utilized in narrow band notch reflectors. There is a perceived need for such narrow band notch reflectors in the near infrared (NIR) range, particularly for use in laser protection. Unfortunately, most holographic media are not sensitive to light in the NIR range. Dichromated gelatin holograms have been made to operate in the NIR by swelling the medium to increase the grating period, but it is difficult to stabilize the resultant holograms. Flat IR holograms have been created by exposing the medium at an oblique angle and thus increasing the grating spacing. However, this method is not applicable to holograms on curved substrates which are often required for laser protection applications. Representative examples of holographic narrow band notch reflectors indicative of the state-of-the-art are described in U.S. Pat. Nos. 4,830,441, 4,802,719, 4,786,125, 4,601,533 and 4,637,678. Many of these prior art methods require complex and undesired processing procedures associated with stacking multiple layers of film.

SUMMARY OF THE INVENTION

The above-discussed and other problems and deficiencies of the prior art are overcome or alleviated by the method of the present invention which utilizes holograms to provide a notch reflector in the near infrared range. In accordance with the present invention, a holographic material is deposited onto an optically clear substrate (e.g., glass and plastic). A pair of beams of different wavelengths are then directed at the holographic material, each producing a standing wave in the material. These two standing waves combine to produce a non-sinusoidal standing wave which determines the index variation of the hologram. Because, in general, the index variation is a nonlinear function of the exposure, a reflection notch at a wavelength greater than the first and second wavelengths is created. This additional notch is a result of the nonlinear mixing between the first and second wavelengths corresponding to the difference frequency. By choosing the first and second wavelength properly, the third notch can be positioned such that it reflects a specific NIR wavelength.

The present invention provides a method for generating a narrow notch reflector which includes wavelengths in the near infrared (NIR) range. This is obtained by using a method of multiplexing whereby a multi-line holographic filter reflecting a plurality of wavelengths is provided. With this approach, the complex processing procedures (of the prior art) associated with stacking multiple layers of films are avoided. Thus many potential problems such as optical clarity, distortion, durability and manufacturability inherent with applying multiple layers onto curved substrates are eliminated.

The above discussed and other features and advantages of the present invention will be appreciated and understood by those or ordinary skill in the art from the following detailed description and drawings.

BRIEF DESCRIPTION OF THE DRAWING

Referring now to the drawings.

DESCRIPTION OF THE PREFERRED EMBODIMENT

Figure 1:
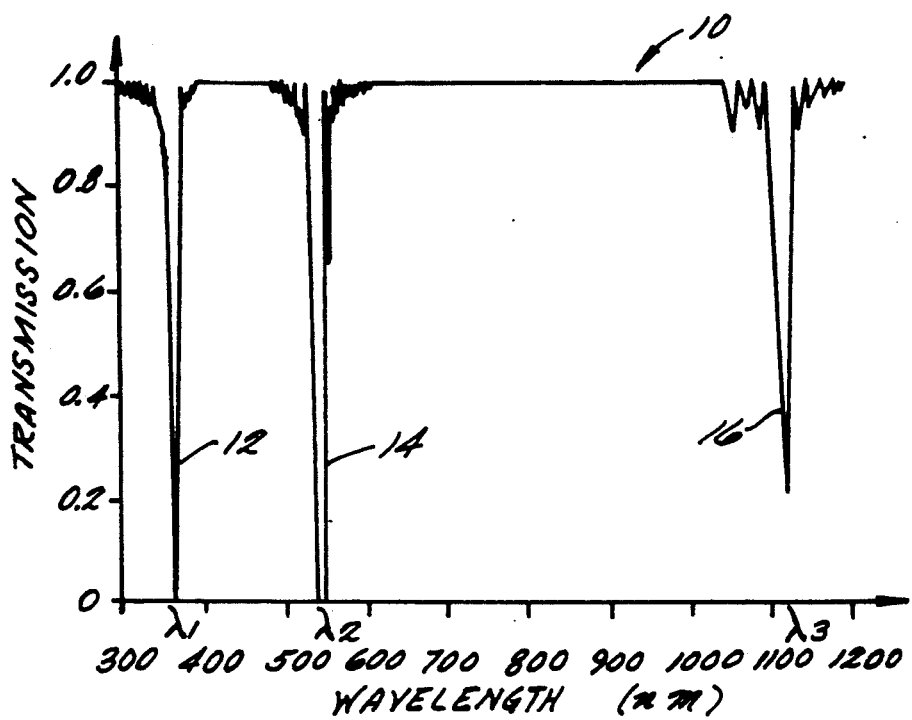
FIG. 1 is a graph illustrating transmission as a function of wavelength for a hologram in accordance with the present invention.

This invention relates to a new method for making holographic notch filters and is particularly well suited for use in making notch filters in the near infrared spectral region. This method utilizes the nonlinearity in the response function of holographic materials. In accordance with the present invention, when a holographic medium is exposed to two laser beams at different wavelengths, the nonlinearity in the response function causes the formation of notch reflections at wavelengths corresponding to the sum and difference frequencies of the exposing beams. The notch at the difference frequency can be in the NIR region by properly choosing the exposure wavelengths. The method of this invention is applicable to holographic filters on both flat and curved substrates.

Methods for making holographic notch reflectors are well known in the art and include for example, U.S. Pat. Nos. 4,830,441, 4,802,719, 4,786,125, 4,601,533 and 4,637,678, all of the contents of which are incorporated herein by reference. The properties of commonly used holographic materials are also well known in the art and described, for example, in U.S. Pat. Nos. 3,658,526, 3,989,530, 4,173,474, 4,535,041, 4,588,664, 4,696,876, 3,694,218, 3,993,485, 4,049,459, 4,258,111, 4,287,277, 3,479,185 and 3,652,275.

The change in the properties (i.e., index of refraction and absorption constant) of a holographic material due to exposure and processing can be described by its response function. For a pure phase grating, the response function relates the refractive index to the total exposure. Exact response function depends on the material properties and processing conditions. In general, the response function is nonlinear because the index variation can never exceed a certain maximum value regardless of the total exposure. This is true for all known holographic materials including dichromated gelatin (DCG), Polaroid dmp-128 and DuPont Omnidex. A typical response function is linear at low exposure, and saturates exponentially as the exposure increases. If the standing wave pattern to which the material is exposed is a simple sinusoidal wave, the nonlinearity of the response function leads to formations of reflection notches at harmonics of the standing wave frequency in addition to that of the notch at the fundamental frequency.

When the material is exposed to multiple sinusoidal standing waves, as in the case of multiplexing, the resultant grating structure is much more complicated. Multiplexed holograms can be made using either simultaneous or sequential exposure. Simultaneous exposure requires multiple beams to illuminate the film at the same time. The beams may have different wavelengths and/or different angles of incidence. It is assumed that the exposure time is the same for all beams. Sequential exposure requires each grating pattern to be exposed sequentially. Sequential exposure provides the flexibility of adjusting the exposure time for each grating individually. On the other hand, the timing sequence must be controlled precisely in order to obtain a desired hologram.

The simultaneous exposure method for multiplexing the hologram, results in a total effective exposure (E) as follows:

$$E = \sum_{h=1}^{N} \tau_h I_h t_h \quad (1)$$

where $\tau_h$ is the sensitivity of the material to the radiation at the laser wavelength used for constructing grating (h). The standing wave intensity for the $h^{th}$ grating is given by $I_h$ and the exposure time is $t_h$. If the total exposure is low, the final index variation of the material is proportional to the total exposure. The response function F(E) which describes the index variation ($\delta_N$) as a function of the total effective exposure E can be expanded as:

$$\delta_n = F(E) = F'(0)E + (F''(0)/2)E^2 + \ldots \quad (2)$$

Using sequential exposure to multiplex the hologram, the contribution of the $h^{th}$ exposure to the final index profile depends on all the other exposures. The response function in general is a multi-variable function. For example, with two wavelength multiplexing, the final index variation can be described as follows:

$$\begin{aligned}\delta_n &= G(E_1, E_2) \\ &= \text{linear terms} + (\tfrac{1}{2})G_{E1}''(0,0)E_1^2 + \\ &\quad (\tfrac{1}{2})G_{E2}''(0,0)E_2^2 + G_{E1'',E2}(0,0)E_1 E_2 + \ldots\end{aligned} \quad (3)$$

where $E_1$ and $E_2$ represent the individual effective exposures and $G''$ represents various second order partial derivatives.

Assume that the two standing wave intensities are:

$$I_1 = 1 + \cos(K_1 z) \quad (4)$$

$$I_2 = 1 + \cos(K_2 z) \quad (5)$$

and the sensitivities of the material and the exposure times are the same. With simultaneous exposure the total effective exposure is proportional to the sum of $I_1$ (EQUATION 4) and $I_2$ (EQUATION 5). Substituting the total effective exposure (i.e., $I_1 + I_2$) into EQUATION 2 and expanding the second order term, results in a DC bias term, a plurality of first order terms and their harmonics, and a plurality of sinusoidal terms with wave number $(K_1 - K_2)$ and $(K_1 + K_2)$. Similarily, if the third order term is expanded, additional sinusoidal terms with wave number $(2K_1 - K_2)$, $(2K_1 + K_2)$, $(2K_2 - K_1)$, $(2K_2 + K_1)$, are obtained. Sinusoidal terms at the sum and difference frequencies can also be obtained for sequential exposure (i.e., EQUATION 3). By applying the method for analyzing the multiplexed hologram, it can be shown that these additional sinusoidal terms in the index profile lead to significant diffraction if the Bragg conditions for these grating structures are satisfied. This is completely analogous to nonlinear optical frequency conversion where one can obtain the sum and difference frequencies by mixing two input waves.

Thus, by properly selecting $K_1$ and $K_2$, (which are determined by the exposure wavelength and exposure angle of each beam) the rejection wavelength corresponding to grating at $(K_1 - K_2)$ can be in the NIR spectral range. Thus, this technique may be used for creating NIR reflectors. Further, the sum and difference terms, $(K_1 + K_2)$, $(2K_1 - K_2)$, etc., may be in a spectral range in which the holographic material is not sensitive or when a laser with that wavelength is not available.

Let us assume that the response function is given by the folowing equations:

$$\delta_n(E) = n_{max}[1 - exp(-\beta E)] \quad (6)$$

where $n_{max}$ is the maximum attainable index change and ($\beta$) is the rate of saturation. Further, assume the two standing waves have intensities $I_1$ (EQUATION 4) and $I_2$ (EQUATION 5). The total index (n) is the sum of a constant DC index and the index variation $\delta_n(E)$. From the index profile, one can calculate the spectral properties of the hologram using well-known numerical methods. FIG. 1 depicts an example of a hologram made in accordance with the method of this invention. Referring to FIG. 1, a curve 10 indicative of the transmission as a function of wavelength for this example is shown. A first notch 12 at $\lambda_1$ is 368 nm and a second notch 14 at $\lambda_2$ is 545 nm which are due to the fundamental gratings. A third notch 16 at $\lambda_1 \lambda_2/(\lambda_2 - \lambda_1)$ is at 1133 nm which is due to the difference frequency grating as a result of nonlinear mixing (i.e., the $(K_1 - K_2)$ term). The reflection efficiency of this grating depends on the second order nonlinear coefficient of the response function as well as the wavelength (e.g., 1.06 microns), thickness of the film (e.g., in the range of 20-14 25 microns) and the average refractive index (e.g., 1.5 for typical holographic materials such as DCG, Polaroid dmp-128 and Dupont Omnidex) of the material. The rest of the second order and third order terms (i.e., the harmonic terms) are generally in the UV range of the spectrum where most holographic materials absorb strongly.

Figure 2:
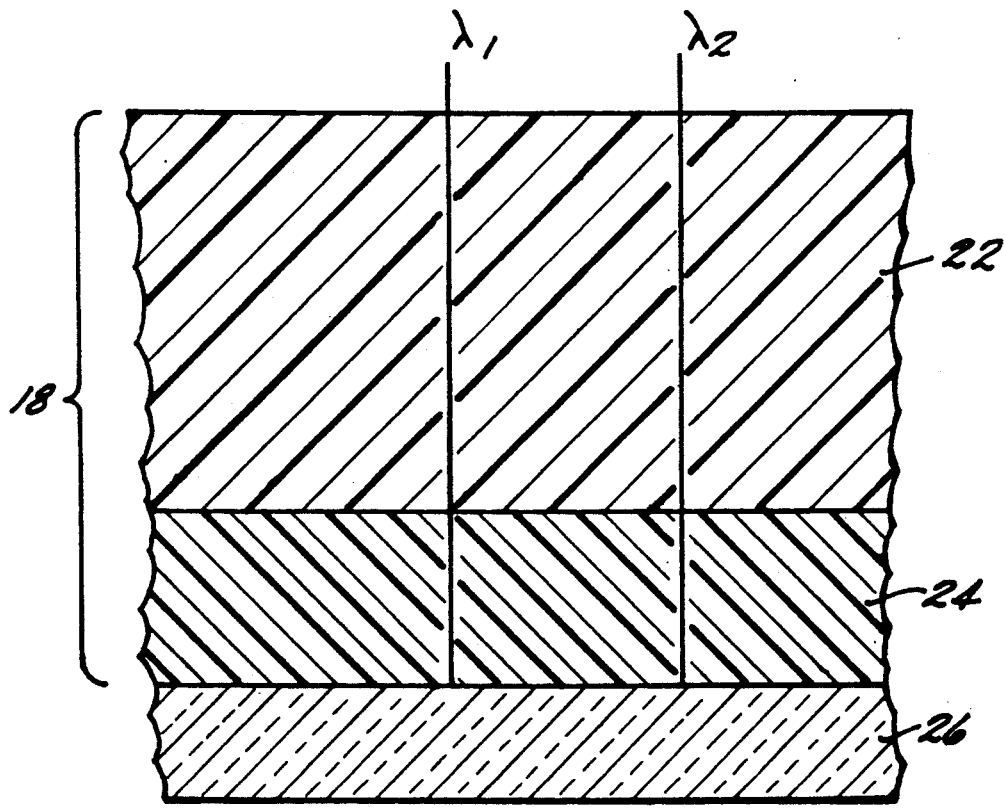
FIG. 2 is a partial cross-sectional view of a hologram and the method for exposing the hologram in accordance with the present invention.

Referring to FIG. 2, wherein a hologram 18 and the method for exposing hologram 18 is shown. In accordance with the present invention, a first beam 20 having a wavelength $\lambda_1$ permeates a photopolymer film 22 and a glass substrate 24 impinging a mirror 26. The combination of film 22 and substrate 24 comprise hologram 18. A first reflected beam is produced, wherein the combination generates a first standing wave indicative of $\lambda_1$. A second beam 32 having a wavelength $\lambda_2$ permeates film 22 and substrate 24 impinging mirror 26. A second reflected beam is produced, wherein the combination generates a second standing wave indicative of $\lambda_2$. A combination of the first and second standing waves results in a single standing wave.

The hologram of this invention may be configured for employment in protective eye wear, sensor-centered filters, or other applications where multiple wavelengths, NIR wavelengths of light are to be reflected.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A holographic notch reflective filter comprising:
   a substrate; and
   a layer of holographic material deposited on said substrate, said holographic material having an index variation therethrough, said index variation being defined by exposure of said holographic material to at least two light beams of differing wavelengths, said holographic material having a plurality of notch reflections at wavelengths corresponding to the sum and difference frequencies of said two light beams.

2. The filter of claim 1 wherein:
said notch reflection at a wavelength corresponding to the differences frequency of said two light beams is in the near infrared region of the spectrum.

3. The filter of claim 1 wherein:
said holographic material has an average refractive index of 1.5.

4. The filter of claim 1 wherein:
said holographic material has a thickness of about 20 to 25 microns.

5. The filter of claim 1 wherein:
said holographic material has a wavelength of about 1.06 microns.

6. The filter of claim 1 wherein:
each of said light beams comprise a laser beam.

7. The filter of claim 1 wherein said index variation has a response function given by:

$$\delta_n(E) = n_{max}(1 - exp(-\beta E))$$

where,
E = a total effective exposure
$\delta_n(E)$ = an index variation as a function of the total effective exposure,
$n_{max}$ = a maximum attainable index change, and
$\beta$ = rate of saturation.

8. The filter of claim 7 wherein said total effective exposure (E) is given by:

$$E = \sum_{h=1}^{N} \tau_h I_h t_h$$

where,
h = a construction grating,
$\tau_h$ = a sensitivity of the holographic material to the light at the wavelength used for construction grating,
$I_h$ = a standing wave intensity for the $h^{th}$ grating, and
$t_h$ = an exposure time.

9. A method of making a holographic notch reflective filter comprising the step of:
exposing a layer of holographic material to at least two light beams of differing wavelengths to provide said holographic material with a plurality of notch reflections at wavelengths corresponding to the sum and difference frequencies of said two light beams and to define an index variation through said holographic material.

10. The method of claim 9 including:
selecting said two wavelengths so that said notch reflection at a wavelength corresponding to the differences frequency of said two light beams is in the near infrared region of the spectrum.

11. The method of claim 9 wherein:
said holographic material has an average refractive index of 1.5.

12. The method of claim 9 wherein:
said holographic material has a thickness of about 20 to 25 microns.

13. The method of claim 9 wherein:
said holographic material has a wavelength of about 1.06 microns.

14. The method of claim 9 wherein:
each of said light beams comprise a laser beam.

15. The method of claim 9 wherein said index variation has a response function given by:

$$\delta_n(E) = n_{max}(1 - exp(-\beta E))$$

where,
E = a total effective exposure
$\delta_n(E)$ = an index variation as a function of the total effective exposure,
$n_{max}$ = a maximum attainable index change, and
$\beta$ = rate of saturation.

16. The method of claim 15 wherein said total effective exposure (E) is given by:

$$E = \sum_{h=1}^{N} \tau_h I_h t_h$$

where
h = a construction grating
$\tau_h$ = a sensitivity of the holographic material to the light at the wavelength used for construction grating,
$I_h$ = a standing wave intensity for the $h^{th}$ grating, and
$t_h$ = an exposure time.

17. A holographic notch reflective filter made by the method of claim 9.

* * * * *